Patented Feb. 10, 1953

2,628,226

UNITED STATES PATENT OFFICE 2,628,226

ADDITION COMPOUNDS OF ROSIN AND MALEIC ANHYDRIDE AND THEIR PRODUCTION

Ray V. Lawrence, Lake City, Fla., and Owen S. Eckhardt, Columbia, Miss., assignors to the United States of America as represented by the Secretary of Agriculture No Drawing. Application March 5, 1951, Serial No. 213,999

8 Claims. (Cl. 260—101)

(Granted under Title 35, U. S. Code (1952), sec. 266)

The invention herein described may be manufactured and used by or for the Government of the United States for governmental purposes without the payment to us of any royalty thereon.

This invention relates to the separation of the addition products of maleic anhydride with rosin or resin acids from the reaction mixture in which they are produced and to the production of a valuable new addition-compound. More particularly, the present invention provides a process by which the valuable tribasic acid which is produced by an addition reaction between levopimaric acid or abietic acid and maleic anhydride (this tribasic acid is hereinafter referred to by the term maleopimaric acid) can be readily recovered, even from mixtures containing the numerous isomers of it which are produced when the addition reaction is conducted at temperatures well above 90° C. in the presence or absence of solvents.

While much theoretical data on the reaction of resin acids with maleic anhydride has been published, "Almost all the theoretical work on this subject was performed on freshly prepared abietic acid of a high degree of purity, on which no oxidation had been allowed to take place, whereas, on the other hand, industry must use rosin stored in barrels, which may or may not have undergone a certain degree of oxidation." (Mattiello "Protective and Decorative Coatings" p. 422.) Hovey and Hodgins found that although the elemental analysis was in close agreement, "By a fusion method, such as is generally used in industry, no chance is afforded to eliminate impurities without subsequent recrystallizations . . . The melting points of all of the final rosin-maleic addition products are lower by more than 100° C. than the melting point of the purified product reported by Arbuzov and Ruzicka." (Ind. and Eng. Chem. 32 272–9, 140.)

Maleopimaric acid finds valuable employment in the preparation of dyes, emulsifying agents, resins and surface coatings. It is obvious that for such applications the color and purity of the maleopimaric acid is of great importance.

When the maleopimaric acid is produced by reacting rosin with maleic anhydride at temperatures above about 90° C., or when an excess of maleic anhydride is employed, the maleic anhydride reacts with the neutral portions of the rosin as well as with the resin acids. Although the principal reaction product is maleopimaric acids the reaction mixture generally contains many compounds having closely related properties, e. g., the addition product of maleic anhydride and dextropimaric acid, the unreacted neutral rosin materials, the addition products of maleic anhydride and neutral rosin materials, and unreacted resin acids.

We have made the surprising discovery that when the mixtures produced by such reactions are contacted with carbon tetrachloride a relatively stable, valuable new compound, the carbon tetrachloride-maleopimaric acid addition product is formed. While the other components of the reaction mixture are soluble in carbon tetrachloride the carbon tetrachloride-maleopimaric acid addition product is not. The carbon tetrachloride-maleopimaric acid addition product can readily be decomposed to yield maleopimaric acid having a melting point within a few degrees of the melting point of carefully purified maleopimaric acid.

The process provided by this invention consists of separating maleopimaric acid in a relatively pure form from mixtures of related compounds by reacting the maleopimaric acid with carbon tetrachloride and separating the carbon tetrachloride addition product of maleopimaric acid.

A preferred method of conducting the process of the invention consists of adding sufficient carbon tetrachloride to the mixture containing maleopimaric acid to both dissolve the components other than maleopimaric acid and to react with the maleopimaric acid, allowing the crystals of the carbon tetrachloride-maleopimaric acid addition product to form, and removing the crystals.

A second preferred method of conducting the process of the invention consists of dissolving the mixture in a small amount of solvent, adding carbon tetrachloride, allowing the crystals of the carbon tetrachloride-maleopimaric acid addition product to form and removing the crystals.

U. S. Patents No. 2,359,989 and 2,409,930 describe processes for the production of maleopimaric acid in a pure form. These processes require the employment of oleoresin as the starting material, the use of volatile organic solvents, and a careful control to avoid temperature above about 90° C.

The second preferred method of conducting the process of this invention provides a valuable method of recovering additional maleopimaric acid from the rosin materials treated by processes such as those of the above patents. If an excess of maleic anhydride is employed in such processes, or if the solvent is removed without a thorough washing out of all of the maleic anhydride used, it is apparent that the remaining rosin materials, before or after all of the solvent is removed, will contain appreciable quantities of maleopimaric acid.

Suitable solvents in which the carbon tetrachloride-maleopimaric acid addition product can be formed include aromatic hydrocarbons such as benzene, toluene, the xylenes and the like; ketones such as acetone, methyl ethyl ketone and the like.

The carbon tetrachloride-maleopimaric acid addition compound is readily formed at normal room temperatures in the presence or absence of a solvent, however, temperatures up to about 120° C. can suitably be employed in its production. Increasing the temperature has its usual effect of increasing the rate of reaction.

The process of the invention can be conducted continuously or in a batch-wise manner and the carbon tetrachloride-maleopimaric addition product can be removed by filtration, centrifugation or by settling and decanting.

The process of the invention has a particularly advantageous feature in that it provides a means of converting rosin to a maleopimaric acid of high purity without the necessary employment of inflammable solvents. The maleopimaric acid can be formed by the conventional fusion methods and isolated in a state of high purity by the use of only non-inflammable carbon tetrachloride. The carbon tetrachloride used in the extraction and in the formation of the carbon tetrachloride-maleopimaric addition compound can be recovered and reused.

The carbon tetrachloride-maleopimaric acid addition product can be readily decomposed quantitatively into carbon tetrachloride and maleopimaric acid by merely heating under atmospheric pressure at about 120° C., preferably to at least 145° C. The carbon tetrachloride evolved during a fire would serve as a protective atmosphere excluding oxygen. The addition product is stable almost indefinitely at atmospheric pressure and ordinary room temperature. The carbon tetrachloride can be condensed and purified for reuse by the conventional processes. The maleopimaric acid produced by the decomposition is in a substantially pure form, but where a product of higher purity is required, it can readily be obtained by a conventional recrystallization.

The following examples are presented to illustrate in detail specific methods of conducting the process of the invention. However, as it is apparent that many modifications in materials, conditions and technique are within its scope, the invention is not to be construed as being limited to the substances and methods of operation recited therein.

EXAMPLE I

*Carbon tetrachloride as the solvent and the precipitating agent*

A sample of gum rosin was mixed with maleic anhydride in a 1:1 molar ratio and heated for about 1 hour at a temperature of 200° C.

A 30 gram sample of the reaction mixture so produced was shaken with 30 mls. of carbon tetrachloride. In about 15 minutes crystals began to form, and in 1 hour the carbon tetrachloride mixture was a nearly solid slurry.

The crystals were removed by filtration and washed with cold carbon tetrachloride. The crystals melted at 125–130° on a Fisher-Johns melting point apparatus.

The crystals were the carbon tetrachloride-maleopimaric acid addition compound. It is a white solid having a definite melting point which is soluble in the ordinary non-polar solvents such as benzene or ether or in polar solvents such as acetone but insoluble in such solvents mixed with substantial amounts of carbon tetrachloride. Upon heating at or above its melting point it effervesces or sinters to leave crystalline maleopimaric acid as a residue while evolving carbon tetrachloride. This compound has valuable uses in addition to its use in the purification of maleopimaric acid, particularly as a readily purifiable intermediate for the production of other compounds.

The carbon tetrachloride-maleopimaric acid, when heated above 130° C. formed an effervescing liquid. When the effervescence had stopped, a solid which melted at 218–22° C. was formed. However, we have found that such compounds can be decomposed without melting them by heating them at about 1° per minute up to about 125° C. In either case the products of decomposition are carbon tetrachloride and maleopimaric acid.

EXAMPLE II

*Carbon tetrachloride added to a solution as the precipitating reagent*

A 30 gram sample of the rosin-maleic anhydride fusion product used in Example I was dissolved in 30 mls. of acetone. 75 milliliters of carbon tetrachloride was added and the solution was warmed on a steam bath evaporating some carbon tetrachloride and acetone. Upon the addition of 30 mls. of carbon tetrachloride, the solution became cloudy and in an hour was almost solid with crystals.

The crystals decomposed upon heating under atmospheric pressure to yield maleopimaric acid having a melting point of 220–3° C., and carbon tetrachloride.

EXAMPLE III

*Preparation of pure maleopimaric acid at 180–190° C.*

A mixture of 100 parts (by weight) of rosin with 20 parts of maleic anhydride was heated for one hour at 180 to 190° C. without allowing it to come into contact with the air, 7.5 grams of the hot reaction product was mixed with 27 grams of carbon tetrachloride. (While contact of the hot materials with air, thus the possibility of peroxide formation, was avoided in this example we have found that refluxing a mixture of a maleic anhydride-rosin reaction product with 0.2% benzoyl peroxide for 2 hours resulted in no difference in the yield or purity of the carbon tetrachloride-maleopimaric acid or the maleopimaric acid recoverable from it.) Crystals of the maleopimaric acid-carbon tetrachloride addition product began to separate after 5 minutes of shaking. When the crystals were heated on a Fisher-Johns melting point apparatus at the rate of 5° per minute, they melted at 125–130° C., resolidified at about 130° and remelted at 225–227° C. The melting point of highly purified maleopimaric acid reported by Arbuzov and Ruzicka was 227–228° C.

A portion of the crystals were washed with carbon tetrachloride and dried overnight in a vacuum desiccator at room temperature, their weight was 4.7 grams. In four days in a vacuum desiccator at room temperature their weight was reduced to 4.18 grams.

Heating the crystals for two hours at 145° C. under reduced pressure produced 2.73 grams of maleopimaric acid melting at 225–227° C. and showing no change in the range of 125 to 130° C.

It is therefore apparent that the 4.7 gram samples of the maleopimaric-carbon tetrachloride addition compound contained substantially 2 moles (1.88) of carbon tetrachloride per mole of maleopimaric acid. The 4.18 gram sample contained 1.38 moles of carbon tetrachloride per mole of maleopimaric acid.

Having thus described our invention, we claim:

1. A carbon tetrachloride-maleopimaric acid addition product, which can be decomposed into carbon tetrachloride and maleopimaric acid by heating at atmospheric pressure at about 120° C. to 130° C. and which melts at about 125 to 130° C.

2. A process for the separation of maleopimaric acid from the mixture produced by heating gum rosin with maleic anhydride to produce maleopimaric acid at a temperature above 90° C., which process comprises, contacting the mixture with enough carbon tetrachloride to react with substantially all of the maleopimaric acid and to dissolve the other components of the mixture, and removing and decomposing the crystals of the carbon tetrachloride-maleopimaric acid addition product by thermal decomposition into maleopimaric acid and carbon tetrachloride.

3. A process for the separation of maleopimaric acid from the mixture produced by heating gum rosin with maleic anhydride to produce maleopimaric acid above 90° C., which comprises, dissolving the mixture in a minimum of acetone, adding enough carbon tetrachloride to react with substantially all of the maleopimaric acid, and removing and thermally decomposing the crystals of the carbon tetrachloride-maleopimaric acid addition product into maleopimaric acid and carbon tetrachloride.

4. In a process for the production of maleopimaric acid by fusing rosin with maleic anhydride to produce maleopimaric acid, the improvement comprising heating the mixture of rosin and maleic anhydride at from 180 to 190° C., mixing the reaction product with carbon tetrachloride until crystals form sufficient carbon tetrachloride being added to form the carbon tetrachloride-maleopimaric acid adduct, removing the crystals and heating them to at least 145° C.

5. In a process for separating at least part of the maleopimaric acid from a mixture containing the same, the improvement comprising reacting at least part of the maleopimaric acid in the mixture with carbon tetrachloride to form a carbon tetrachloride-maleopimaric acid addition product, said mixture being one which is soluble in carbon tetrachloride.

6. The process of claim 5 in which the addition product is thermally decomposed to maleopimaric acid and carbon tetrachloride.

7. A process for making maleopimaric acid, comprising heating rosin with maleic anhydride to produce maleopimaric acid, mixing the reaction products with sufficient carbon tetrachloride to react with the maleopimaric acid and to dissolve the other components of the reaction mixture, and crystallizing out the adduct of maleopimaric acid and carbon tetrachloride from the solution.

8. In a process in which rosin is reacted with maleic anhydride to form maleopimaric acid, the improvement in the separation of the latter acid from the reaction mixture, comprising: converting it into the adduct with carbon tetrachloride by mixing the reaction mixture with a molar excess of carbon tetrachloride and crystallizing out the said adduct.

RAY V. LAWRENCE.
OWEN S. ECKHARDT.

REFERENCES CITED

The following references are of record in the file of this patent:

Wienhaus et al.: Berichte 69 B–1939, pp. 2202–2206.